No. 620,034. Patented Feb. 21, 1899.
S. P. HEDGES.
BICYCLE PATH OR SIDEWALK LEVELER AND ROLLER.
(Application filed Oct. 11, 1898.)

(No Model.)

WITNESSES:

INVENTOR
Samuel P. Hedges
BY
ATTORNEYS.

UNITED STATES PATENT OFFICE.

SAMUEL P. HEDGES, OF GREENPORT, NEW YORK.

BICYCLE-PATH OR SIDEWALK LEVELER AND ROLLER.

SPECIFICATION forming part of Letters Patent No. 620,034, dated February 21, 1899.

Application filed October 11, 1898. Serial No. 693,250. (No model.)

*To all whom it may concern:*

Be it known that I, SAMUEL P. HEDGES, of Greenport, in the county of Suffolk and State of New York, have invented a new and Improved Bicycle-Path and Sidewalk Leveler and Roller, of which the following is a full, clear, and exact description.

The object of my invention is to provide a simple, durable, and economic machine particularly adapted for leveling and rolling bicycle-paths and sidewalks.

A further object of the invention is to so construct the machine that it may be conveniently controlled by a single individual and whereby when the scrapers are to be brought in contact with the ground the movement of the controlling-lever will be in direction of the operator, enabling the operator to work the scraper-blades to great advantage and at the least possible expenditure of power.

Another object of the invention is to provide pivoted shoes at the front portion of the machine, which shoes tend to support said forward portion of the machine and are so shaped as to carry the machine evenly over small or moderately large depressions in the path or sidewalk, enabling the scraper-blades to act evenly upon the surface to be dressed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
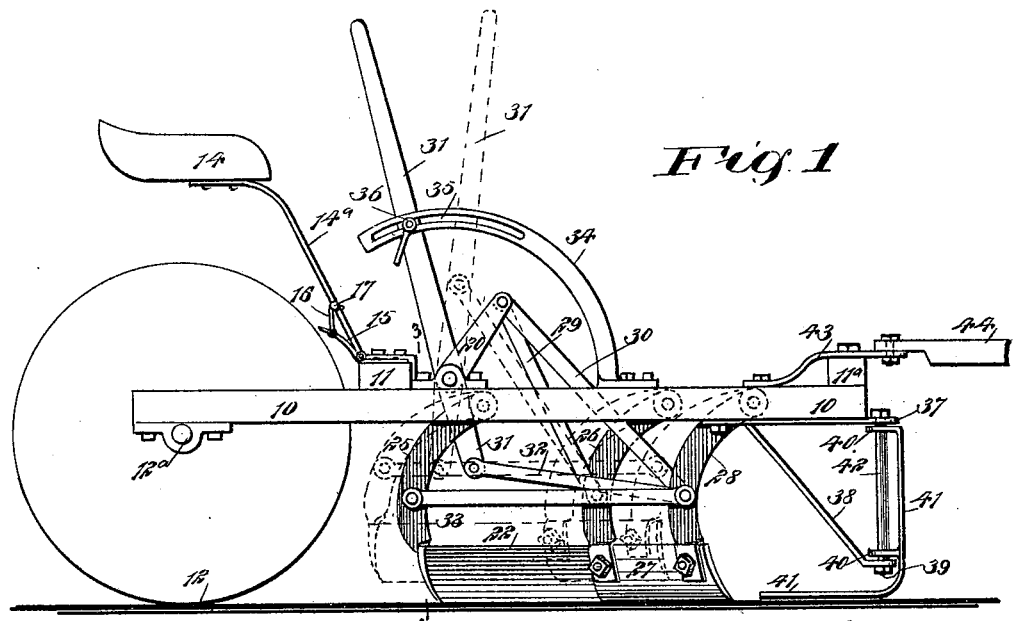
Figure 2:
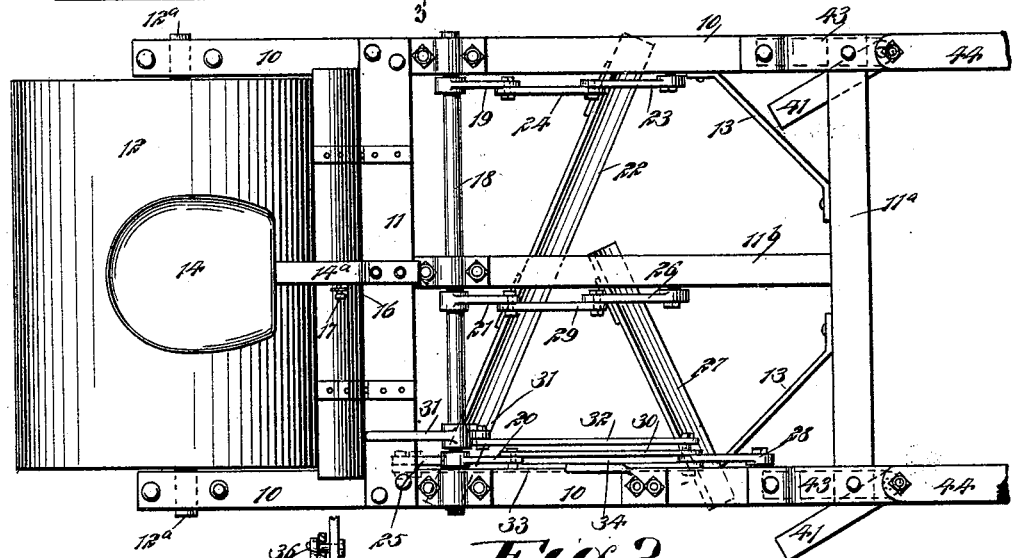
Figure 3:
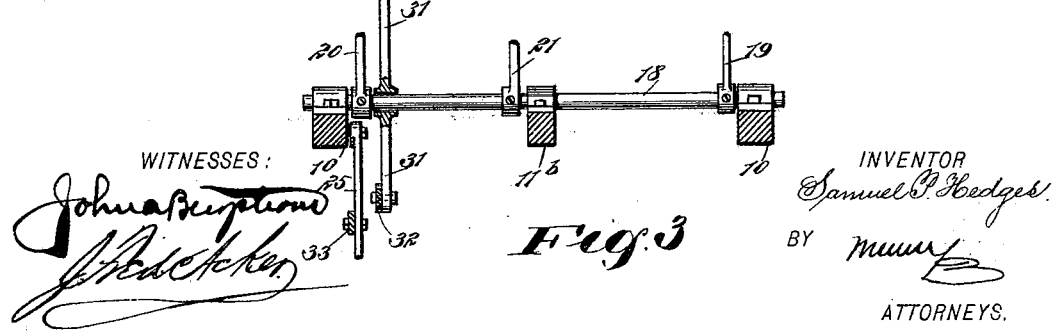

Figure 1 is a side elevation of the improved machine. Fig. 2 is a plan view of the machine, and Fig. 3 is a vertical transverse section taken substantially on the line 3 3 of Fig. 1.

The frame consists, preferably, of two side beams 10 connected by a cross-bar 11 near the rear, and a forward cross-bar $11^a$, together with a central longitudinal bar $11^b$, which latter bar extends from the cross-bar 11 to the cross-bar $11^a$. At the rear of the cross-bar 11 the trunnions $12^a$ of a roller 12 are journaled in the side beams of the frame, and the frame is braced at the front by corner-irons 13 or their equivalents. The seat 14 is supported by a standard $14^a$, the said seat-standard being attached to the rear cross-bar 11, as shown in Figs. 1 and 2, and a cleaning-blade 15 is hinged upon the rear portion of the rear cross-bar 11, which blade is adapted when in operation to engage with the periphery of the roller 12 and clean the said peripheral surface from any substance that may adhere thereto. When the cleaning-blade is not needed, it may be held out of engagement with the roller 12 by any suitable means. As shown in the drawings, however, a hook 16 is attached to the cleaning-blade and is arranged for engagement with a pin 17, secured upon the seat-standard $14^a$, as shown particularly in Fig. 1.

A shaft 18 is journaled in front of the rear cross-bar 11 in suitable bearings located upon the side beams 10 of the frame. Near the left-hand end of the shaft 18 an upwardly-extending crank-arm 19 is secured, and near the right-hand end of the shaft a corresponding crank-arm 20 is attached to said shaft, while a third and central crank-arm 21 is also secured to the shaft, all of the crank-arms having the same upward and forward inclination.

The machine is of that type in which a diagonal scraper-blade is employed extending from side to side of the machine, acting in conjunction with a forward and shorter scraper-blade also diagonally placed, the shorter scraper-blade extending in a reverse direction to the longer one. The longer scraper-blade 22 extends from a point below the shaft 18 at the right-hand side of the machine to a point considerably in advance of the shaft 18 at the left-hand side of the machine, as shown in Fig. 1. The longer scraper-blade 22 is supported at its forward or left-hand end by a pivoted and preferably forwardly-curved hanger 23, said hanger being connected with the left-hand side beam of the frame, while the right-hand end of the longer scraper-blade is supported by a similarly-curved hanger 25, pivoted upon the right-hand side beam of the frame just below the shaft 18. The left-hand hanger 23 is connected with the left-hand crank-arm 19 through the medium of a link 24. The rear end of the shorter scraper-blade 27 approaches the central forward portion of the longer scraper-blade 22, and the left-hand or inner end of the shorter scraper-blade 27 is supported by a forwardly-curved hanger 26, pivoted upon the central beam 11ᵇ of the frame, while the right-hand or forward end of the shorter scraper-blade 27 is supported by a forwardly-curved hanger 28, pivotally attached to the right-hand beam 10 of the frame. The inner hanger 26 for the shorter scraper-blade 27 is connected by a link 29 with the central crank-arm 21 on the shaft 18, while the outer or right-hand hanger 28 of the shorter scraper-blade is connected by a link 30 with the right-hand crank-arm 20, as shown in Figs. 1 and 2. A controlling-lever 31 is pivoted on the shaft 18, near its right-hand end, the controlling-lever extending both above and below the shaft, and the lower end of the controlling-lever 31 is connected by a link 32 with the right-hand hanger 28 of the shorter scraper-blade, the same pivot-pin being utilized for the purpose that serves to pivot the link 30 to said hanger, and the same pivot-pin likewise serves to pivotally attach to the hanger 28 a link 33, which link 33 extends rearward to a pivotal connection with the right-hand hanger of the longer scraper-blade 22, as shown in Fig. 1. Under such a construction it is obvious that when the lever 31 is drawn toward the driver's seat both of the scraper-blades will be simultaneously carried downward to an engagement with the surface over which the machine is to be drawn, thus enabling the operator to exert all his strength, if necessary, upon the downward movement of the blades; and it is furthermore evident that the connection between the two scraper-blades and the shaft 18 is such that both scraper-blades will be simultaneously raised and lowered.

In order that the scraper-blades may be held in either their upper or lower positions, a guide-arm 34 is secured to the right-hand beam 10 of the frame, the said guide-arm being rearwardly curved and provided with a slot 35, through which a set-screw 36 is passed, the said screw being carried by the lever 31, as shown in Figs. 1 and 3.

The forward end of the machine is not supported upon wheels, but instead shoes are employed, and for that purpose arms 37 are forwardly projected from the forward ends of the side beams of the frame, and likewise downwardly and forwardly extending braces 38 are employed at the front of the frame. The upper arms 37 and the lower portions of the braces 38 act as bearings for vertical shafts 39, which shafts 39 pivotally receive eyes 40, attached to shoes 41, each of said shoes comprising a vertical and a horizontal member, as shown particularly in Fig. 1, and between the eyes 40 of the shoes 41 a sleeve 42 is mounted to turn on the said shaft 39. Thus it will be observed that the shoes are pivotally connected with the frame and do not interfere in the slightest degree with the turning qualities of the machine, but rather tend to assist the machine in making a turn. Furthermore, the shoes have such extended bearing on the ground as to carry the machine evenly over large ruts in the surface over which the machine is to pass, thus insuring the scraper-blades 22 and 27 during the operation of the machine remaining almost constantly in engagement with the ground in such manner as to insure an even surface.

Clevis-bars 43 are projected forwardly from the front upper portion of the frame, and shafts 44 are attached to said clevis-bars 43 in any suitable or approved manner.

I desire it to be understood that my improvement can be used with equally good results upon scrapers having a single blade as upon scrapers having a multiplicity of blades.

Having thus described my invention, I claim as new and desire to secure by Letters Patent—

1. In a road-scraper, the combination, with a frame, scraper-blades arranged diagonally on the frame, one in advance of the other, the forward blade being shorter than the rear blade and being at an angle to said rear blade, and hangers pivoted to the said frame and to the said scraper-blades, of a rock-shaft provided with three crank-arms near its ends and at its center, one of the end crank-arms being attached to one hanger of the longer scraper-blade, the other end crank-arm being attached to one of the hangers of the shorter scraper-blade, the intermediate crank-arm being attached to the other hanger of the shorter scraper-blade, a link connection between corresponding hangers of the longer and shorter scraper-blades, a controlling-lever attached to the said shaft, and a link connection between the controlling-lever and a hanger of the shorter scraper-blade, for the purpose set forth.

2. In a road-scraper, the combination, with a frame, a roller journaled at the rear of the frame, a cleaning-blade for the said roller, a long and a short scraper-blade, the two blades being at angles to one another, and hangers for the end portions of the scraper-blades, the hangers being pivotally attached to the frame of the machine, of a rock-shaft provided with a crank-arm near each end and a crank-arm near its center, one of the end crank-arms of the shaft having a link connection with a hanger of the longer scraper-blade, the other end crank-arm of the shaft having a link connection with one of the hangers of the shorter scraper-blade, the other hanger of the shorter scraper-blade having a link connection with the intermediate crank-arm of said rock-shaft, a link connection between corresponding hangers of the scraper-blades, a controlling-lever having a link connection with a hanger of the shorter scraper-blade, and a guide and locking device for the said controlling-lever, substantially as shown and described.

3. In a road-scraper or like machine, the combination, with a frame, scrapers carried thereby, and a roller also carried by said frame, the roller being at the rear of the scrapers, of shoes pivotally attached to the forward portion of the said frame in advance of the scrapers, the said shoes being angular in construction, substantially as set forth.

4. In a road-scraper, angular shoes pivotally attached to the forward portion of the scraper-frame, the said shoes serving as supports for the forward portion of the frame, as described.

5. A road-scraper having supporting-shoes mounted to swing upon vertical pivots located near their forward ends, substantially as described.

6. A road-scraper, comprising a frame, two scraper-blades having pivoted suspension from the frame, a rock-shaft having crank-arms thereon, links connecting the crank-arms with the scrapers to secure synchronous swinging thereof, and a lever connected independently with the scrapers for swinging them, substantially as described.

7. A road-scraper, comprising a frame, two scraper-blades having pivoted suspension from the frame, and set at reverse angles, a rock-shaft having crank-arms thereon, and links connecting the crank-arms with the scrapers to secure synchronous swinging thereof, a lever connected independently with the scrapers for swinging them, a segment-bar adjacent the lever and clamping means therefor carried by the lever, substantially as described.

8. A road-scraper, comprising a frame, two scraper-blades having pivoted suspension from the frame and set at reverse angles, a rock-shaft having crank-arms thereon, and links connecting the crank-arms with the scrapers to secure synchronous swinging thereof, a lever pivoted upon the rock-shaft, and a link connecting said lever with one of the scrapers, substantially as described.

SAMUEL P. HEDGES.

Witnesses:
CHAS. R. LYON,
O. JUDD WEBB.